United States Patent Office 3,138,454
Patented June 23, 1964

3,138,454
GLASS SEALING
Robert D. Williams, Bridgeville, Pa., assignor to Universal-Cyclops Steel Corporation, Bridgeville, Pa., a corporation of Pennsylvania
No Drawing. Filed Sept. 12, 1961, Ser. No. 137,519
1 Claim. (Cl. 75—122)

This invention relates to glass-to-metal seals and to a new alloy particularly suited to the production of glass-to-metal seals.

In certain industrial applications, such as in the production of electronic tubes, radio tubes and the like, it is necessary to join metals to glass. For this purpose, a wire or strand of metal is placed where the seal is desired and is heated to a temperature at which the glass is fused and forms a seal with the metal. A necessary characteristic of a metal used for this purpose is that the seal created by the bond between the metal and the glass be continuous. In addition, the material sealed into the glass must have a coefficient of expansion sufficiently similar to that of the glass to avoid introducing strains in the resulting joint.

One of the disadvantages encountered with metals now being used for glass-sealing purposes is the possible formation of bubbles at the interface of the glass-to-metal seal resulting in leaks in the product which may cause premature failure in service. The reason for the creation of these bubbles is not clearly and conclusively understood. Nevertheless, it is known that such action can cause many rejections and, therefore, is very undesirable from the manufacturer's viewpoint.

One method that has been employed with glass sealing alloys heretofore, to avoid the development of bubbles in the seal, has been the use of hydrogen annealing to reduce the amount of undesirable contaminants which are believed to cause the bubbles. Another method has been the use of certain alloy additions but those developed to the present time have proven inadequate in minimizing the bubble difficulty. As is evident, the production of this glass-metal seal constitutes but a small part of the cost of articles such as electronic tubes and radio tubes. Obviously, therefore, it becomes grossly expensive in the production and use of such articles to be required to reject them in production stages or have them fail while in service because of an inadequate seal.

It is, therefore, a primary object of the present invention to provide new glass-to-metal seals that are rugged and bubble free and that can be produced without need of a particular annealing cycle or other unconventional procedure to attain a satisfactory seal.

It is another object of the invention to provide a new alloy particularly suited to the purposes set forth in the preceding object.

These and other objects are attained in accord with this invention upon using as the metal sealing component in producing glass-to-metal seals, an alloy containing, by weight, carbon ranging from an impurity level to 0.10 percent, manganese within the range of about 0.25 to 1.25 percent, up to 1.00 percent of silicon, 0.08 to 1.00 percent of zirconium, 35 to 55 percent of nickel and the remainder iron and incidental impurities that do not deleteriously affect the properties of the resulting alloy for the purposes stated. Upon producing a glass-to-metal seal with an alloy within the range of composition just mentioned, there results a seal that is bubble free, that is characterized by a coefficient of expansion substantially similar to that of the glass, and which is successfully produced in accordance with standard techniques.

Within the foregoing range, particularly satisfactory results for the stated purposes are attained with an alloy composition within the following range, in weight percent: 0.01 to 0.08 percent carbon, 0.75 to 1.00 percent of manganese, 0.10 to 0.50 percent of silicon, 0.8 to 0.75 percent of zirconium, 4 to 55 percent of nickel and the remainder iron and incidental impurities. The preferred zirconium content is within the range of 0.08 to 0.40 percent and even a zirconium content of 0.08 to 0.20 has been found to be quite effective. Production experience had with other glass-to-metal sealing alloys heretofore has been such that alloys within the preferred range are easily adapted to present commercial applications. Hence, the preferred range constitutes the range of composition within which the most immediate commercial utility exists.

Alloys having a composition of the present invention are made in accordance with standard mill practices. The alloys can be shaped by any means desired for use in producing metals to be used for glass-to-metal seals, but strip and wire forms are those most generally used.

In order to verify the effectiveness of zirconium in alloys of my invention, a series of heats was melted. The heats were made to the same basic composition. Each heat was split or cast into two portions. The first portion cast was of the basic composition without any zirconium addition while the second portion had a zirconium addition in amounts to obtain variable zirconium contents in the cast product. The cast product of each of these split heats was forged to ¾" squares. Samples from each heat were then given the bubble test which consists of placing a piece of common borosilicate glass on a smooth surface of the alloy and then heating to 1650° F. After 30 minutes at this temperature the specimen is cooled to room temperature and examined for evidence of bubbling. The compositions of the alloys made and the results of the bubble tests are shown in the following Table I.

Table I

| Heat | Ni | Zr | Bubble Test Results |
|---|---|---|---|
| 1 | 42.40 | <.01 | Unsatisfactory. |
| 2 | 42.30 | .08 | Satisfactory. |
| 3 | 42.20 | <.01 | Unsatisfactory. |
| 4 | 42.31 | .11 | Satisfactory. |
| 5 | 42.40 | <.01 | Unsatisfactory. |
| 6 | 42.26 | .12 | Satisfactory. |
| 7 | 41.52 | <.01 | Unsatisfactory. |
| 8 | 42.00 | .13 | Satisfactory. |
| 9 | 41.65 | .011 | Unsatisfactory. |
| 10 | 41.40 | .18 | Satisfactory. |
| 11 | 42.40 | <.01 | Unsatisfactory. |
| 12 | 41.80 | .20 | Satisfactory. |
| 13 | 42.30 | <.01 | Unsatisfactory. |
| 14 | 42.35 | .25 | Satisfactory. |
| 15 | 41.75 | .014 | Unsatisfactory. |
| 16 | 40.80 | .32 | Satisfactory. |
| 17 | 42.50 | <.01 | Unsatisfactory. |
| 18 | 42.40 | .40 | Satisfactory. |

It will be observed from the results given in Table I that the basic compositions having no zirconium addition produced unsatisfactory bubble tests while the portion of each split heat having an intentional zirconium addition were satisfactory in the bubble tests. Thus, it was evident that the zirconium addition was outstandingly effective in the bubble test. Tests performed in a consumer's plant confirmed the reliability of the bubble test for they, likewise, had a similar experience when sealing alloys with and without zirconium additions.

To exemplify the alloys of my invention, I am describing the procedure followed in making and testing heats 1 and 2. A 35 pound heat of a nickel-iron alloy having a nominal composition of 0.09 percent carbon, 0.50 percent manganese, 0.10 percent silicon, and 42 percent nickel was prepared and melted in an electric induction furnace. When the heat was melted and in condition for pouring, one-half of the molten alloy was cast into an ingot mold.

The other half of the molten metal was retained in the furnace and an addition of zirconium sufficient to produce a content of 0.08 percent was made. This half of the heat was then cast into an ingot mold. After cooling to room temperature the ingots were heated in the same furnace to a temperature suitable for forging. Analyses of the two heats are given in the following Table II.

*Table II*

| Heat | C | Mn | Si | Ni | Zr |
|---|---|---|---|---|---|
| 1 | .087 | .53 | <.02 | 42.40 | >.01 |
| 2 | .093 | .41 | .15 | 42.30 | .08 |

Each ingot was forged to a bar ¾ of an inch square. Samples were cut from the cross-section of the bars of each heat resulting in pieces ¾ of an inch square by about ½ of an inch long. The cross-section of the samples were prepared by grinding flat and smooth. Pieces of common borosilicate glass about ¼ of an inch square were placed on the prepared cross-sections of the alloy samples and these arrangements placed in a furnace. The arrangements were heated to a temperature of 1650° F. and held at this temperature for about 30 minutes. The glass fuses at this temperature and adheres to the surface of the alloy. The specimens were then removed from the furnace and cooled to room temperature. The specimens, after cooling, were examined for evidence of bubbling. The specimens from heat 1 made without a zirconium addition produced many bubbles at the interface between the glass and the alloy and would be unsatisfactory as a glass-sealing alloy. The specimens from heat 2 made with an intentional zirconium addition showed no evidence of bubbles at the interface between the glass and the alloy indicative of a satisfactory seal. Furthermore, specimens of these two heats were tested in a consumer's plant where results were obtained similar to those reported above.

The coefficients of thermal expansion of product of heats 1 and 2 were determined by conventional methods, measuring it from room temperature to 400° C. The coefficient of thermal expansion of material from heat 1 made without a zirconium addition was found to be, in two tests, 62.6 and $62.5 \times 10^{-7}$ in./in./° C., while that of heat 2 made with an intentional zirconium addition was 62.5 and $62.5 \times 10^{-7}$ in./in./° C. These coefficients of thermal expansion are entirely satisfactory for the application described herein. It is to be noted that the zirconium has not had any significant effect on the coefficient of expansion. This is of importance since the coefficient varies with the nickel content so that it is thus possible to vary the nickel content in accordance with known data to achieve the desired coefficient of thermal expansion and not be required to make any critical adjustments in the composition.

To further confirm the advantages of zirconium additions for glass-to-metal seals, a split heat of higher nickel content was made, one-half of which had no zirconium addition and the remaining half having an intentional zirconium addition. The analyses of these two heats are given in the following Table III.

*Table III*

| Heat | C | Mn | Si | Ni | Zr |
|---|---|---|---|---|---|
| 19 | .011 | .39 | .14 | 46.65 | |
| 20 | .014 | .43 | .39 | 46.05 | .60 |

The product of these two heats were, likewise, forged to bars ¾ of an inch square, samples cut and prepared as previously described. The bubble test was carried out with the result that specimens from heat 19 without a zirconium addition exhibited undesirable bubbles while specimens from heat 20 containing 0.60 zirconium produced a satisfactory bubble test. These results were confirmed on specimens tested in a consumer's plant.

The coefficients of thermal expansion of heats 19 and 20 were determined using the previously described method. Product of heat 19 made without a zirconium addition had a coefficient of thermal expansion, in two tests, of 78.4 and $77.3 \times 10^{-7}$ in./in./° C., while that of heat 20 containing 0.60 zirconium was 78.9 and $78.0 \times 10^{-7}$ in./in./° C. These results confirm that the zirconium had no significant effect on the coefficient of thermal expansion.

From the foregoing data and discussion, it is evident that this invention provides improved glass-to-metal seals in that bubble and strain free seals are provided without significant heat treatment and the like for the parts being joined. Moreover, the alloy of the invention is particularly useful in that within the stated ranges, the compositions can vary to a larger extent than heretofore has been possible without destroying the usefulness of the resulting alloy.

In accordance with the provisions of the patent statutes, the principle of the invention has been described with what is now believed to be its best embodiment. However, it should be understood that the invention may be practiced otherwise than as specifically described.

What is claimed is:

A substantially gas free glass-to-metal alloy seal, said metal alloy having a composition consisting essentially, by weight, of 0.01 to 0.08 percent of carbon, 0.75 to 1.00 percent of manganese, 0.10 to 0.50 percent of silicon, 0.08 to 0.75 percent of zirconium, 40 to 55 percent of nickel and the remainder iron and incidental impurities.

References Cited in the file of this patent

UNITED STATES PATENTS

| | | |
|---|---|---|
| 626,655 | Guillaume | June 6, 1899 |
| 2,167,482 | Hull et al. | July 25, 1939 |
| 2,217,422 | Scott | Oct. 8, 1940 |
| 2,471,079 | Post et al. | May 24, 1949 |
| 2,602,736 | Sheridan et al. | July 8, 1952 |
| 2,797,991 | Laufle et al. | July 2, 1957 |

OTHER REFERENCES

Chambers, G. H.: Zirconium. In Metals and Alloys, December 1933, pages 199–201 (page 201 relied on).

UNITED STATES PATENT OFFICE
CERTIFICATE OF CORRECTION

June 23, 1964

Patent No. 3,138,454

Robert D. Williams

It is hereby certified that error appears in the above numbered patent requiring correction and that the said Letters Patent should read as corrected below.

Column 3, Table II, sixth column, line 1 thereof, for ">.01" read -- <.01 --.

Signed and sealed this 27th day of October 1964.

(SEAL)
Attest:

ERNEST W. SWIDER
Attesting Officer

EDWARD J. BRENNER
Commissioner of Patents